United States Patent
Hanna

(10) Patent No.: US 10,445,522 B2
(45) Date of Patent: *Oct. 15, 2019

(54) SYSTEMS AND METHODS FOR INCREMENTAL, REVERSIBLE AND DECENTRALIZED BIOMETRIC IDENTITY MANAGEMENT SYSTEM

(71) Applicant: Keith J. Hanna, Bronxville, NY (US)

(72) Inventor: Keith J. Hanna, Bronxville, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/133,116

(22) Filed: Sep. 17, 2018

(65) Prior Publication Data

US 2019/0057223 A1    Feb. 21, 2019

Related U.S. Application Data

(63) Continuation of application No. 15/681,104, filed on Aug. 18, 2017, now Pat. No. 10,078,758.

(51) Int. Cl.
*H04L 29/00* (2006.01)
*G06F 21/62* (2013.01)
*G06F 21/32* (2013.01)
*G06F 16/23* (2019.01)
*G06F 16/2457* (2019.01)

(52) U.S. Cl.
CPC .......... *G06F 21/6227* (2013.01); *G06F 16/23* (2019.01); *G06F 16/2457* (2019.01); *G06F 21/32* (2013.01); *G06F 21/6245* (2013.01)

(58) Field of Classification Search
CPC ... G06F 21/6227; G06F 16/23; G06F 16/2457
USPC .......................................................... 726/28
See application file for complete search history.

(56) References Cited

U.S. PATENT DOCUMENTS 9,509,690 B2 * 11/2016 Carter ................... H04L 9/0816
2007/0112775 A1 * 5/2007 Ackerman ............. G06F 21/32

* cited by examiner

*Primary Examiner* — Brandon S Hoffman
*Assistant Examiner* — Michael D Anderson
(74) *Attorney, Agent, or Firm* — Foley & Lardner LLP

(57) ABSTRACT

This disclosure describes methods and systems for a biometric identity management system capable of being deployed incrementally one organization at a time, and also reversibly, such that any organization can unsubscribe at any time. A biometric processing engine can perform biometric matching between records from a first database and a second database, whereby the databases have been established independently of each other. Each record comprises a biometric record and a corresponding identifier unique across databases. If a biometric record of a first record and a biometric record of a second record are from a same individual, the first record comprising a first unique identifier and the second record comprising a second unique identifier are linked. Using the first or second unique identifiers, access to information about the individual linked to both the first record in the first database and the second record in the second database is provided.

20 Claims, 13 Drawing Sheets

| | Record Index Example | Comment |
|---|---|---|
| Non-Unique | Index 1 (two individuals → Index 1) | A given index number does not uniquely refer to a single individual |
| Unique | Index 1, Index 2 | A single index number uniquely refers to a single individual. Only one index number refers to a single individual |
| Poly-unique | Index 1, Index 3, Index 2, Index 4 | A given index number uniquely refers to a single individual. More than one index number can refer to the same individual |

FIG. 2

| Probability of match based on: | Pf(Biometric 1) | Pf(Biometric 2) | Pf(Field 1) | Pf(Field 2) | P(Combined) | (1-P(combined)) x 100,000,000 |
|---|---|---|---|---|---|---|
| 1 biometric with high probability | 1/20000 | 1/2 | 1/2 | 1/2 | 0.99995 | 5,000 |
| 2 biometrics with high probability | 1/20000 | 1/20000 | 1/2 | 1/2 | 0.9999999975 | 0.25 |
| 1 biometric with medium probability | 1/200 | 1/2 | 1/2 | 1/2 | 0.995 | 500,000 |
| 2 biometrics with medium probability | 1/200 | 1/200 | 1/2 | 1/2 | 0.999975 | 2,525 |
| 1 biometric with medium probability + 2 ancillary identification methods with low probability | 1/200 | 1/2 | 1/50 | 1/50 | 0.9999979 | 209 |
| 2 biometrics with medium probability + 2 ancillary identification methods with low probability | 1/200 | 1/200 | 1/50 | 1/50 | 0.9999999895 | 1.05 |

FIG. 5

SYSTEMS AND METHODS FOR INCREMENTAL, REVERSIBLE AND DECENTRALIZED BIOMETRIC IDENTITY MANAGEMENT SYSTEM

RELATED APPLICATIONS

The present application claims the benefit of priority under 35 U.S.C. § 120 as a continuation of U.S. patent application Ser. No. 15/681,104, filed Aug. 18, 2017 titled "Systems and Methods for an Incremental, Reversible and Decentralized Biometric Identity Management System" which is incorporated by reference herein in its entirety.

FIELD OF THE DISCLOSURE

The present application generally relates to scalable identity management systems, including but not limited to systems and methods that use biometrics.

BACKGROUND

Conventionally, identity management systems use technical approaches that are designed to optimize the final technical performance of the overall system. However, when an identity management system is to be deployed across countries or across different organizations, then differences in policy, privacy and other non-technical limitations can prevent the common deployment of those technical approaches. Moreover, once an organization has subscribed to a particular identity management system and its technical approach, then it is often difficult to unsubscribe or revert back to any existing identity management system in case the new system has unforeseen drawbacks for a particular organization, and this in itself can be a barrier to adoption. In addition, from a logistical viewpoint, it is perceived to be difficult and expensive to manage the deployment of an identity management system at the same time across countries or across organizations.

BRIEF SUMMARY

In some aspects, the present disclosure is directed towards systems and methods for a decentralized identity management system that can be deployed incrementally one organization at a time, and also reversibly, such that any organization can unsubscribe at any time and can easily revert to any existing identity management system.

In one aspect, this disclosure is directed to a method for an identity management system capable of being deployed incrementally. In some embodiments, the method comprises: performing, by a biometric processing engine executing on at least one server, biometric matching between a first plurality of records from a first database and a second plurality of records from a second database, the first database and the second database established independently of each other. Each record from the first and second pluralities of records may comprise a biometric record, and a corresponding identifier implemented to be unique across databases including the first and second databases. The biometric processing engine may determine that a first biometric record of a first record from the first database and a second biometric record of a second record from the second database, are from a same individual. The first record may include a first unique identifier and the second record comprising a second unique identifier. A records arbitrator may maintain in a poly-unique identity table on a storage device responsive to the determination, a link between the first unique identifier of the first record from the first database, and the second unique identifier of the second record from the second database. The records arbitrator may provide via one or more network interfaces to the first and second databases, in response to receiving a request identifying the first unique identifier or the second unique identifier, access to information about the individual linked to the first record and stored in the first database, and information about the individual linked to the second record and stored in the second database, according to the link maintained in the poly-unique identity table.

In some embodiments, determining that the first biometric record and the second biometric record are from the same individual comprises determining that a level of matching between the first biometric record and the second biometric record exceeds a predefined threshold. Each of the first biometric record and the second biometric record may include two types of biometric data.

In certain embodiments, the method further comprises using the first unique identifier or the second unique identifier identified in the received request, to index into the poly-unique identity table to identify the first record of the first database and the second record of the second database. In some embodiments, the information about the individual linked to the first record and the information about the individual linked to the second record comprises at least one of medical or financial related information.

In certain embodiments, the method further comprises performing biometric matching between a third plurality of records from a third database of the databases, and at least one of the first and second pluralities of records, the third database established independently of the first and second databases. The biometric processing engine may determine that a third biometric record of a third record from the third database is from the same individual, the third record comprising a third unique identifier. The records arbitrator may update in the poly-unique identity table responsive to the determination that the third biometric record is from the same individual, the link to include the third unique identifier of the third record from the third database.

In some embodiments, the method further comprises determining that a third biometric record of a third record from the first database is from an individual different from that corresponding to other biometric records in the first and second databases, the third record comprising a third unique identifier. The records arbitrator may maintain, in the poly-unique identity table, an entry with the third unique identifier of the third record from the first database.

In certain embodiments, the method further comprises removing, by the records arbitrator, from the poly-unique identity table, the link between the first unique identifier of the first record from the first database and the second unique identifier of the second record from the second database, responsive to an instruction to cease providing access to the information stored in the first database.

In some embodiments, the first database, the second database, and the poly-unique identity table are each maintained by a different organization or entity. In certain embodiments, the first database and the poly-unique identity table are maintained by a first organization or entity, and the second database is maintained by a second organization or entity.

In another aspect, this disclosure is directed to a system for incremental and reversible deployment of a decentralized identity management system. The system may include a biometric processing engine executing on at least one server.

The biometric processing engine may be configured to perform biometric matching between a first plurality of records from a first database and a second plurality of records from a second database. The first database and the second database may be established independently of each other. Each record from the first and second pluralities of records may include a biometric record, and a corresponding identifier implemented to be unique across databases including the first and second databases. The biometric processing engine may determine that a first biometric record of a first record from the first database and a second biometric record of a second record from the second database, are from a same individual. The first record may include a first unique identifier and the second record may include a second unique identifier. The system may include one or more network interfaces to the first and second databases. A records arbitrator may be configured to maintain, responsive to the determination, in a poly-unique identity table on a storage device, a link between the first unique identifier of the first record from the first database, and the second unique identifier of the second record from the second database. The records arbitrator may provide, via the one or more network interfaces, in response to receiving a request identifying the first unique identifier or the second unique identifier, access to information about the individual linked to the first record and stored in the first database, and information about the individual linked to the second record and stored in the second database, according to the link maintained in the poly-unique identity table.

In some embodiments, the biometric processing engine is further configured to determine that the first biometric record and the second biometric record are from the same individual, by determining that a level of matching between the first biometric record and the second biometric record exceeds a predefined threshold. In some embodiments, each of the first biometric record and the second biometric record includes two types of biometric data.

In some embodiments, the records arbitrator is further configured to use the first unique identifier or the second unique identifier identified in the received request, to index into the poly-unique identity table to identify the first record of the first database and the second record of the second database. In certain embodiments, the information about the individual linked to the first record and the information about the individual linked to the second record comprise at least one of medical or financial related information.

In some embodiments, the biometric processing engine is further configured to perform biometric matching between a third plurality of records from a third database of the databases, and at least one of the first and second pluralities of records, the third database established independently of the first and second databases. The biometric processing engine may determine that a third biometric record of a third record from the third database is from the same individual, the third record comprising a third unique identifier. The records arbitrator may be configured to update, in the poly-unique identity table responsive to the determination that the third biometric record is from the same individual, the link to include the third unique identifier of the third record from the third database.

In some embodiments, the biometric processing engine is further configured to determine that a third biometric record of a third record from the first database is from an individual different from that corresponding to other biometric records in the first and second databases, the third record comprising a third unique identifier; and the records arbitrator is further configured to maintain, in the poly-unique identity table, an entry with the third unique identifier of the third record from the first database.

In some embodiments, the records arbitrator is further configured to remove, from the poly-unique identity table, the link between the first unique identifier of the first record from the first database and the second unique identifier of the second record from the second database, responsive to an instruction to cease providing access to the information stored in the first database.

In some embodiments, the first database, the second database, and the poly-unique identity table are each maintained by a different organization or entity. In certain embodiments, the first database and the poly-unique identity table are maintained by a first organization or entity, and the second database is maintained by a second organization or entity.

BRIEF DESCRIPTION OF THE FIGURES

The foregoing and other objects, aspects, features, and advantages of the present solution will become more apparent and better understood by referring to the following description taken in conjunction with the accompanying drawings, in which:

FIG. 2 illustrates poly-unique indexing in one embodiment;

FIG. 5 shows an example of how one or more biometrics, and/or one or more ancillary pieces of identifying information, may be combined probabilistically to make a determination of identity with a given probability;

DETAILED DESCRIPTION

Figure 1:
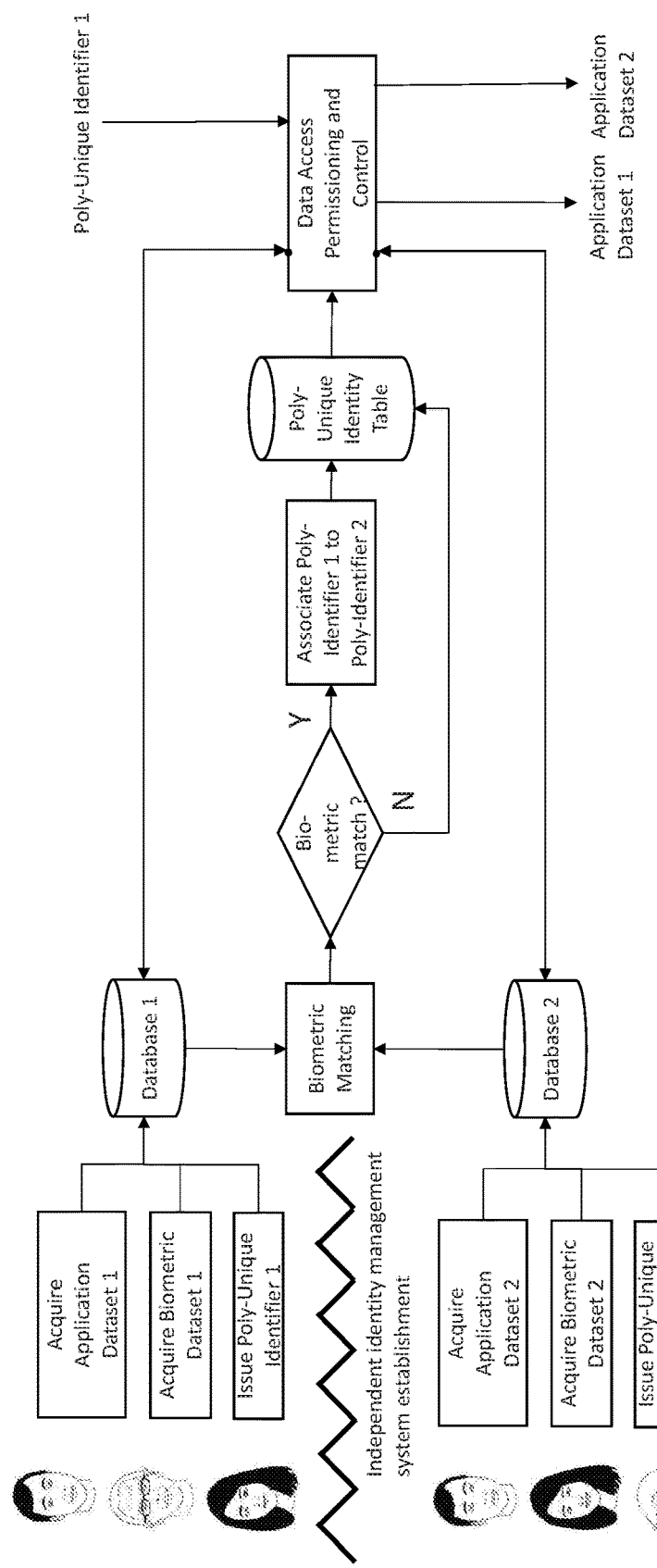
FIG. 1 is a block diagram of one embodiment of a biometric identity management system.
Figure 3:
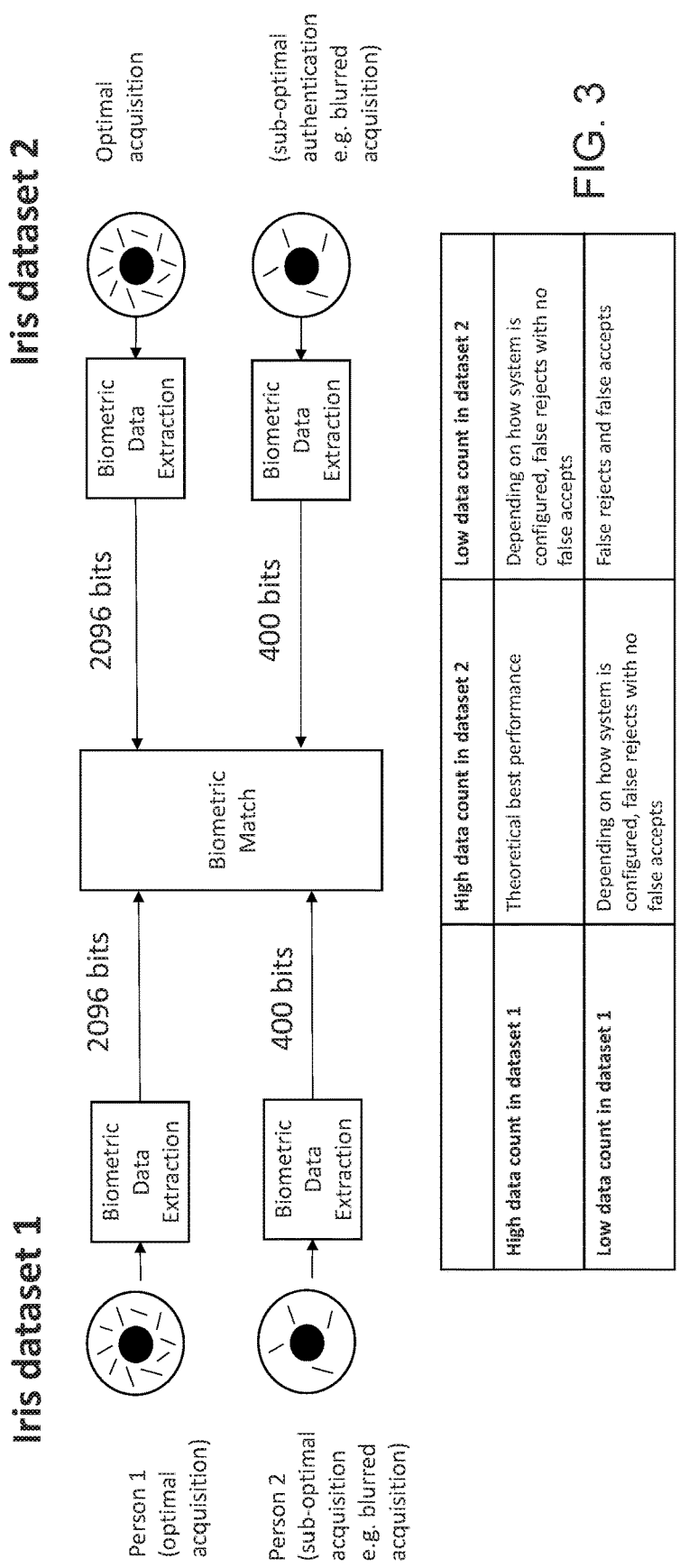
FIG. 3 illustrates how accuracy of an iris biometric may depend in some embodiments on quality of the data acquisition.

FIG. 1 shows a block diagram of one embodiment of a system for decentralized identity management, that is capable of being deployed incrementally. The establishment of a first database is shown at the top left, and the independent establishment of a second database is shown at the bottom left. In this particular embodiment, there may be three categories of data that are either acquired, generated or retrieved in the establishment of a database. A first category is the acquisition or retrieval of application data, which may include the name, address, date of birth of a particular individual, and financial, medical or other application-specific information that relates to the individual. A second category is the acquisition of a biometric dataset. This may include iris biometric data, fingerprint data or any other biometric data. This shall be discussed in more detail later in the specification. A third category is the independent generation and issuance of a poly-unique identifier. This can be contrasted to the issuance of a unique identifier, where a single individual is uniquely indexed by a single number. FIG. 2 illustrates possible difference(s) between a non-unique, a unique and a poly-unique identifier. The first row in FIG. 2 shows an example of non-unique identifiers. In this case, a given index does not uniquely refer to a given individual. The second row in FIG. 2 shows an example of unique identifiers. In this case, a single index number uniquely refers to a single individual. Database 2 may have been established at a later time, at a different location, or by a different organization compared to the establishment of Database 1, making it impossible to use a unique identifier as defined in FIG. 2 since there is no coordination at the time of the establishment of the databases, and the generation and issuance of an index number in particular, to avoid the potential repetition of index numbers in each database which would result in a non-unique identifier as defined in FIG. 2. The third row in FIG. 3 shows an example of poly-unique identifiers. In this case more than one index number can refer to a single individual, however the index numbers themselves are unique. In some embodiments, the advantage of the poly-unique identifier is that an identity management system containing biometric and other information of one individual can be established independently without any knowledge of a prior or future identity management system that may or may not contain the same individual. Methods for generating and issuing the poly-unique identifier shall be discussed later in this specification.

Referring again to FIG. 1, as discussed previously, the ancillary information, biometric information and the poly-unique identifier may in some embodiments be established completely independently of each other and may be stored in database 1 and database 2 corresponding to identity management 1 and 2 respectively, as shown. In some embodiments, after the identity management system(s) and the corresponding databases have been established independently, biometric matching may be performed between the biometric information stored in database 1 and the biometric information stored in database 2. In addition, matching of ancillary data such as name, date of birth or address may be performed. In some embodiments the purpose of the biometric matching (with or without ancillary data) is to determine whether the same individual is in both databases. The methods for performing this matching shall be discussed in more detail later in this specification. If such a match determination is made, then the poly-unique identifier from the first identity management system for that particular record can be associated to the poly-unique identifier for the matched record from the second identity management system, and the association may be stored in the poly-unique identity table, as shown in FIG. 2 for instance. If a match determination is not made, then the poly-unique identifier from the record may be stored in the poly-unique identity table as a separate record. In some embodiments, the poly-unique identity table is inputted into a Data Access Permissioning and Control module, as shown in FIG. 2 for instance. Also inputted into the module is, in this example, the poly-unique identifier 1 that was generated and issued and stored in database 1 of the first identity management system. As discussed previously, this poly-unique identifier may only be known to the organization that controls and established the first identity management system. In some embodiments, the data access permissioning and control module then locates poly-unique identifier 1 in the poly-unique identity table to determine whether the poly-unique identifier is associated to any other poly-unique identifiers in either identity management system 1 and 2 with their corresponding databases 1 and 2 respectively. If such an association exists, then in some embodiments the linked poly-unique identifier is used to retrieve the application data for that particular record from either identity management system 1 or 2.

In some embodiments, this enables the Data Access Permissioning and Control module to retrieve Application Data for a particular individual from both identity management system 1 and 2 and their corresponding databases 1 and 2 respectively, using (e.g., only using) the poly-unique index from the record in identity management system 1 (or from a record in identity management system 2), even though the identity management systems may have been established independently by different organizations at different times.

As shall be described later, the method illustrated in FIG. 1 can be extended so that the Application Data for a particular individual from any number of identity management systems that have been established completely independently at different times and by different organizations, can be retrieved by the Data Access Permissioning and Control module, using (e.g., only using) the poly-unique index corresponding to the individual known only to a single organization for instance.

Biometric Matching

As described earlier in this specification, in some embodiments biometric matching is performed between biometric data from a first identity management system stored in a first database and biometric data from a second identity management system stored in a second database. In some embodiments, the biometric matching may be performed together with the matching of ancillary data such as name, date of birth or address. Biometrics may be used in some embodiments since ancillary information may be imprecise due to incorrect or ambiguous data entry, may change over time due to name or address changes, or may be unknown with any precision. Biometrics have the advantage of being a function of the individual themselves.

In some embodiments, the identity management system may be designed to eventually incorporate millions of individuals from thousands of decentralized identity management systems established independently. The match process should therefore be able to identify the same individual across these millions of records. There are many factors however that affect the performance of the biometric matching. A first factor is the fundamental discriminating information in a given biometric. For example, Daugman in U.S. Pat. No. 5,291,560 has shown that the iris biometric can be highly discriminating, and with optimally-acquired data has a false match rate of the order of 1 in 1 million for a single eye, and significantly higher for two eyes.

Figure 4:
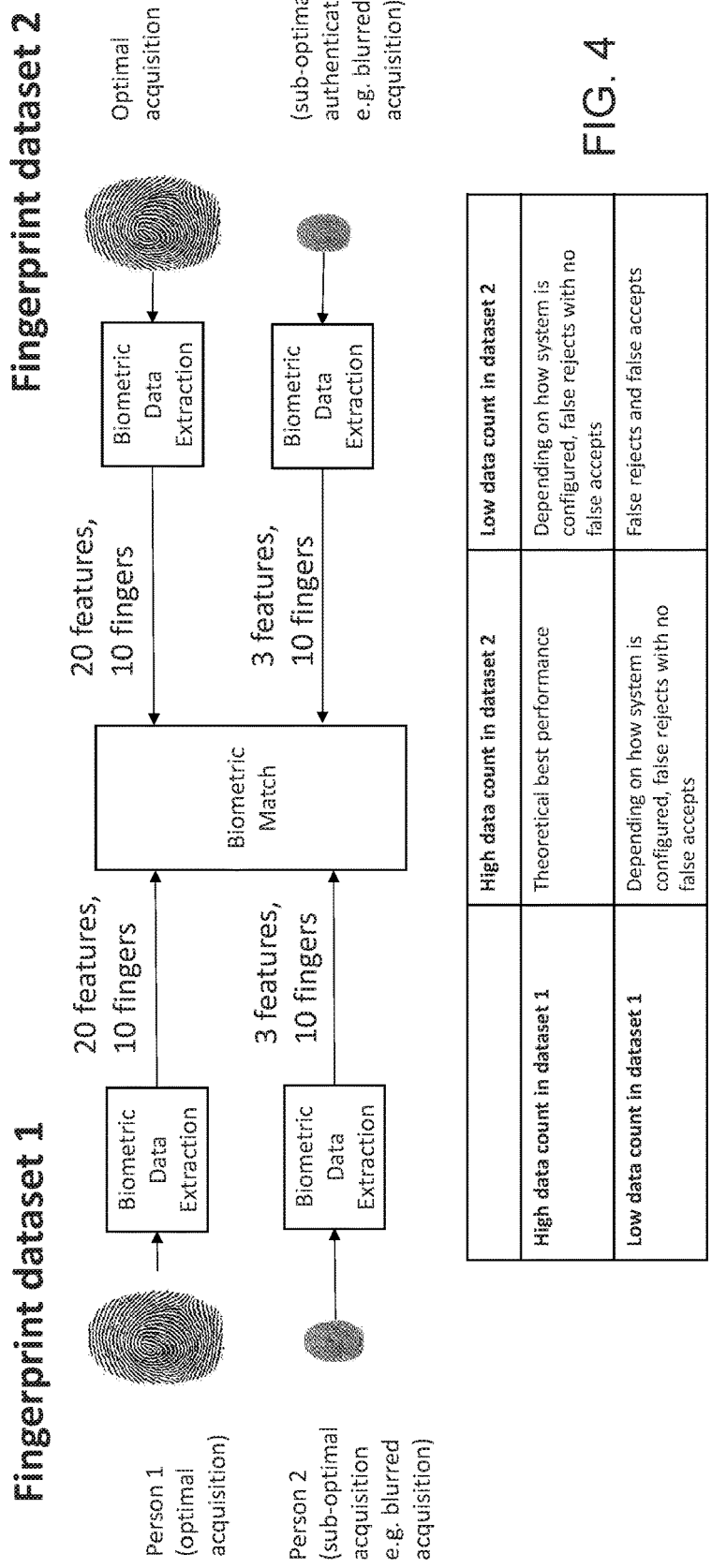
FIG. 4 illustrates how accuracy of a fingerprint biometric may depend in some embodiments on quality of the data acquisition.

However, in one aspect of the invention, as the biometric identity management system is scaled up so that millions of people are enrolled, then the inability to deploy thousands of skilled enrollment staff means that the quality-control of the enrollment process may decrease so that the data being acquired is sub-optimal. This is illustrated in more detail in FIG. 3 for instance. The top row illustrates an optimal acquisition of iris data. The iris may be well-focused, the eye may be wide-open and the eyelashes are not occluding the iris data for instance. In this case, the data in the iris is well-conditioned, and in this illustrative example, 2096 bits of an iris code may be available for biometric matching. The bottom row may show a suboptimal acquisition of iris data. In this case, the iris may be out-of-focus, and/or the eye may be less open, and/or eyelashes may occlude the iris data. In this illustrative example, there may be only 400 bits available for matching. Another example using the fingerprint biometric is shown in FIG. 4, for instance. The top row illustrates an optimal acquisition of fingerprint data. The fingers may be well-focused, the user may have presented the user's fingers to a device with uniform pressure, and the fingerprints themselves may be clear. In this case, the data in the fingerprints may be well-conditioned, and 20 points of interest (features such as ridge-ends, for example) in each of 10 fingers can be acquired. The bottom row illustrates sub-optimal acquisition of fingerprint data. In this case, the fingerprints are smudged, due to motion of the user during the acquisition process, and the fingerprint features themselves may be worn, due to manual labor, for example. In this case, the data in the fingerprints may be ill-conditioned, and there may only be 3 points of interest in each of the 10 fingers acquired. At the bottom of FIGS. 3 and 4 are the implications, in certain embodiments, of such differences in raw information. If both dataset 1 and dataset 2 are acquired optimally, then a match result with the theoretical best probability of matching can be recovered, as shown by the top left entry of the table at the bottom of both FIGS. 3 and 4. However, if one or both of the datasets contain suboptimal data, then one or more of the false-accept rate, false-reject rate or failure-to-acquire rate can increase.

In addition, in another aspect of the invention and in certain embodiments, in addition to the fundamental information available in the biometric data in the scaled deployment of the biometric identity management system as described above, it can be useful to modify the biometric match threshold to greatly reduce the false-reject rate or the failure-to-acquire rate even if it means that the false-accept rate is increased. This is because even a small failure-to-acquire rate of, for example 0.1%, can scale to hundreds of thousands of users, and these users may have no biometric information assigned to them at all. By modifying the match threshold in this way, then almost all users can have some biometric information assigned to them. The penalty however for modifying the match threshold in this way is that the ability of the particular biometric to differentiate between different users can be greatly reduced. This is addressed by combining multiple sources of information, each with a pre-defined probability of match, in order to increase the overall probability of match.

In more detail, FIG. 5 shows an example of such probability combination for various configurations of the biometric identity management system. In this example, up to 4 match probabilities are combined; 2 are biometric match probabilities (for example from iris and fingerprint matching respectively) with each of high and medium probability of matching depending on the quality of data acquisition as described above, and 2 are ancillary-data-based matching (e.g. name, date of birth, address).

The use of ancillary information such as name, date of birth, and address during the matching process depends in some embodiments and in some applications of the biometric identity management system on whether there is an incentive or disincentive for the user to purposively provide incorrect information. In cases where there is no incentive to purposively provide incorrect information, then in some embodiments then it is expected that the information provided would be partially accurate (for example, spelling mistakes or ambiguous data entry may occur) and in some embodiments it may be assumed that the match data follows a Gaussian distribution. In cases where there is an incentive to purposively provide incorrect information, then the ancillary information for matching can be avoided. In some embodiments, the probabilities of match may be assumed to be independent, follow a Gaussian distribution, and can be recovered from testing performed a priori. Probabilities with such properties can be combined using standard probability analysis such that:

$$P(\text{combined})=P(1)*P(2)*P(3)* \ldots /((P(1)*P(2)*P(3)* \ldots )+(1-P(1))*(1-P(2))*(1-P(3))* \ldots ))$$

where $P(1), P(2), P(3) \ldots$ are the individual probabilities of match contributed by each biometric or ancillary dataset.

Returning to FIG. 5, the first row shows matching performed using 1 biometric (the iris in this example) wherein the data acquired is relatively high quality. The a priori probability of an incorrect match, $Pf(1)$, in this case is 1 in 20,000. This may appear a high probability compared to the over 1 in 1 million probability of false accept reported by Daugman in U.S. Pat. No. 5,291,560, for example, but as discussed earlier, the operating points of the biometric match algorithms in some embodiments may be adjusted in order to reduce the false-reject or failure-to-acquire rates, at the expense of this false-accept rate. Continuing with the example in the first row in FIG. 5, no other information is used in the matching for instance, such that the a priori probability of the other 3 factors are each 1 in 2 (50%). The probability of a true match, $P(\ldots)$ can be computed in some embodiments such that $P(\ldots)=1-Pf(\ldots)$. Using the formula above, the combined probability of a true match in row 1 is then P(combined)=0.99995. In a system that incorporates 100 million individuals, then this means that 100e6×(1−0.99995)=5,000 individuals may be incorrectly matched. Depending on the application of the biometric identity management system, then this error may or may not be a problem. For example, the biometric identity management system may be designed to increase the efficiency of identity management for the vast majority of individuals in totality, even if exceptions have to be managed separately using other processes.

Row 2 in FIG. 5 shows another example where 2 biometrics (for example, in this case, the iris and finger biometrics) are acquired and used for matching. In a system that incorporates 100 million individuals, then almost no individuals (0.25) are expected to be incorrectly matched. Row 3 in FIG. 5 shows another example where 1 biometric is acquired, but where the data being acquired is sub-optimal. The a priori probability of false match in this example is 1 in 200. In a system that includes 100 million individuals, then it is expected that 500,000 individuals may be incorrectly matched. Row 4 in FIG. 5 shows another example where 2 biometrics (iris and fingerprint) are each acquired sub-optimally and each with an a priori probability of false match of 1 in 200. In this case, in a system that incorporates 100 million individuals, it is expected that 2,525 individuals may be incorrectly matched. Row 5 in FIG. 5 shows another example where 1 biometric acquired sub-optimally is used for matching together with 2 pieces of ancillary information (e.g. name, date of birth, address), each with a 1 in 50 probability of false match due to misspelling and ambiguities, for example. In this case, in a system that includes 100 million individuals, then it is expected that 209 individuals may be incorrectly matched. As described earlier however, it is important to understand whether the matching characteristics of the ancillary data follows a Gaussian distribution or whether the distribution is skewed by an incentive or disincentive for the user to provide incorrect information. Row 6 in FIG. 5 shows the result of matching using 2 biometrics acquired sub-optimally, and 2 pieces of ancillary information. In this case, in a system that incorporates 100 million individuals, then it is expected that 1 (1.05) individuals may be incorrectly matched.

Poly-Unique Index Generation

As described earlier in this specification, in some embodiments, the advantage of the poly-unique identifier is that an identity management system that includes or maintains biometric and other information for one individual can be established independently without any knowledge of a prior or future identity management systems that may or may not contain the same individual.

In some different biometric identity management systems, index numbers comprising 11 digits for instance, have been used. Even though this 11 digit number can index over 99 billion (99×10^9) users in a coordinated fashion, if these index numbers are generated and issued independently as in an embodiment of this invention, then the probability of two indices being the same is remarkably high even after a relatively small number of indices have been independently issued. In more detail, from probability analysis, the probability P of one instance of two independently-generated numbers being the same, for large numbers, is:

$$P=1-e^{((-n(n-1)/2)/q)}$$

where q is the number of possible indices in the range, and n is the number of users to whom index numbers have been generated and assigned independently. In the case of an 11 digit index number, then q=99,999,999,999 at most. For an approximately P=50% probability of 2 independently-generated numbers being the same, the number of users to whom index numbers have been assigned independently would be just n=375,000. For an approximately P=95% probability of 2 independently assigned numbers being the same, then n=780,000. For a biometric identity management system that is to be deployed to incorporate millions of individuals, this is unacceptable since there is an extremely high probability that an index number for an individual can be non-unique, as shown in the first row of FIG. 2.

In one embodiment, the poly-unique index is generated such that the probability of re-occurrence of the independently-generated indices is small, and in some embodiments this probability of re-occurrence may be less than the probability of an incorrect match from the biometric match engine to ensure that the performance of the indexing method is able to meet or exceed the performance of the matching process to ensure precise correspondence of records.

In some embodiments, the poly-unique index is generated using a Universally-Unique-Identifier (UUID) algorithm, such as that proposed by Sun Microsystems.

In certain embodiments, the result is a 128 bit number where 103 trillion independently-generated indices are to be generated before there is a 1 in 1 billion probability of a duplication.

Incremental Updating of the Decentralized Biometric Identity Management System

Figure 6:
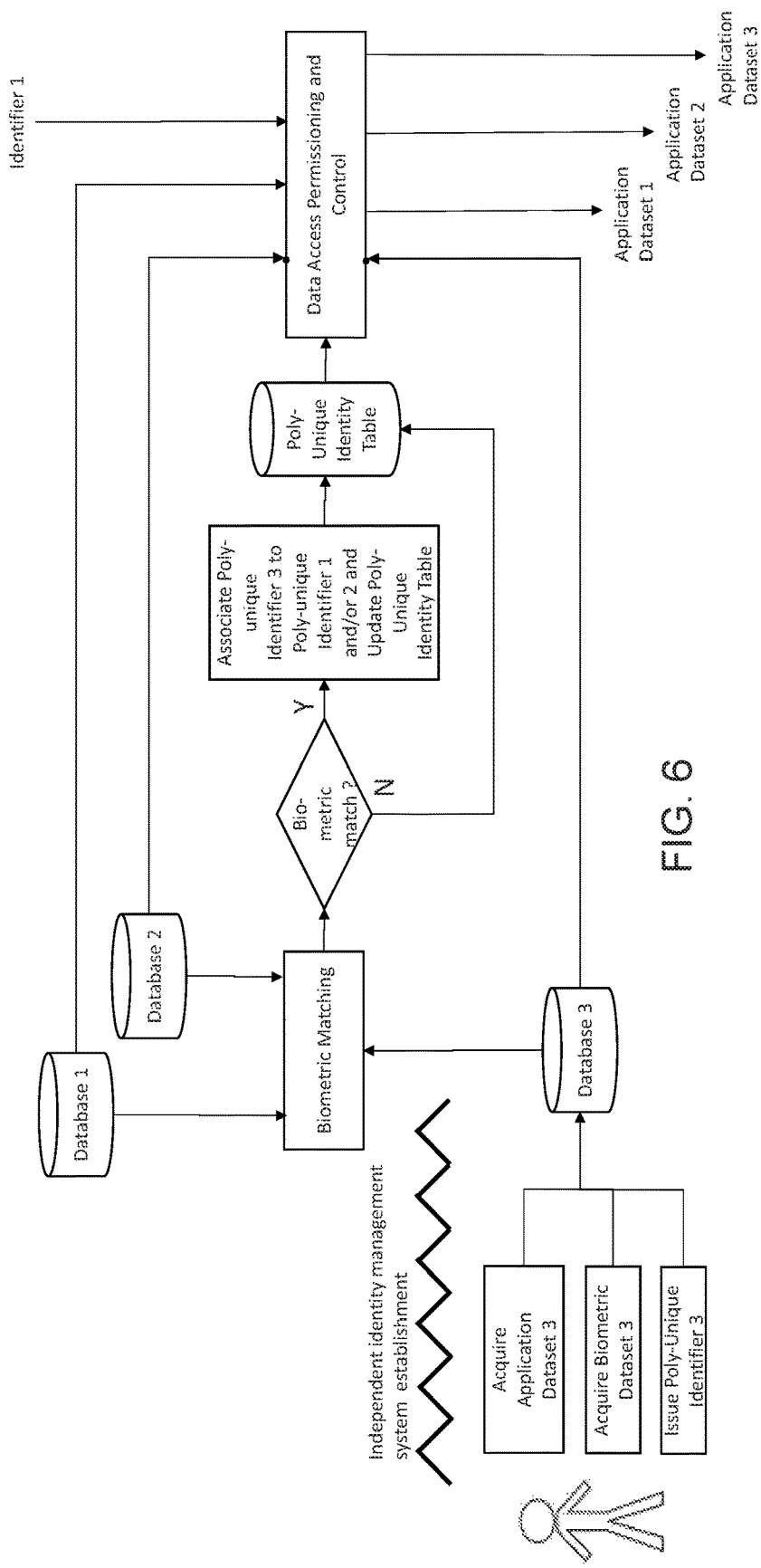
FIG. 6 illustrates in one embodiment how information from a third database may be incorporated into the identity management system that already incorporates information from a first and second database.

As mentioned earlier, in one aspect of the embodiment, the method illustrated in FIG. 1 can be extended so that the Application Data for a particular individual from any number of identity management systems that have been established independently at different times and by different organizations, can be retrieved by the Data Access Permissioning and Control module, using just the poly-unique index corresponding to the individual known only to a single organization for instance. FIG. 6 shows a specific example of one embodiment of this updating process. In this case it is assumed that the poly-unique link table already exists corresponding to the first identity management system and its corresponding database and the second identity management system and its corresponding database using the methods described previously. In FIG. 6, a third independently-established identity management system and its corresponding database is then incorporated incrementally into the biometric identity management system in the same way that the second and first databases were incorporated. Specifically, biometric matching is performed between the biometric data in the independently-established first and second identity management systems, and the biometric data in the independently-established and incrementally-introduced third identity management system, as shown in FIG. 6. If a determination of a match is made, then the poly-unique identifier from the third identity management system and for that particular record can be associated to the poly-unique identifier for the matched record from the first and/or second identity management system, and the poly-unique identity table may be updated and the association stored, as shown in FIG. 6 for instance. If a determination of a match is not made, then the poly-unique identity table may be updated such that the identifier from the record is stored as a separate record. In some embodiments, the poly-unique identity table is inputted into a Data Access Permissioning and Control module, as shown in FIG. 6. Also inputted into the module is, in this example, the poly-unique identifier 1 that was generated and issued and stored in the first identity management system and its corresponding database. As discussed previously, this poly-unique identifier may only be known to the organization that controls and established the first identity management system. In some embodiments, the data access permissioning and control module then locates poly-unique identifier 1 in the poly-unique identity table to determine whether the poly-unique identifier is associated to any other poly-unique identifiers in either identity management systems 1, 2 or 3. If such an association exists, then in some embodiments the linked poly-unique identifier is used to retrieve the application data for that particular record from either identity management system 1, 2 or 3.

In some embodiments, this enables the Data Access Permissioning and Control module to retrieve Application Data for a particular individual from identity management systems 1, 2 and 3, using (e.g., only using) the single poly-unique index from a record in identity management system 1 (or from a record in identity management system 2 or 3), even though the identity management systems may have been established independently by different organizations at different times. This shows how in some embodiments the decentralized biometric identity management system can be deployed incrementally across countries or across different organizations at different times.

Example Use Case of Incremental and Decentralized Deployment

Figure 7:
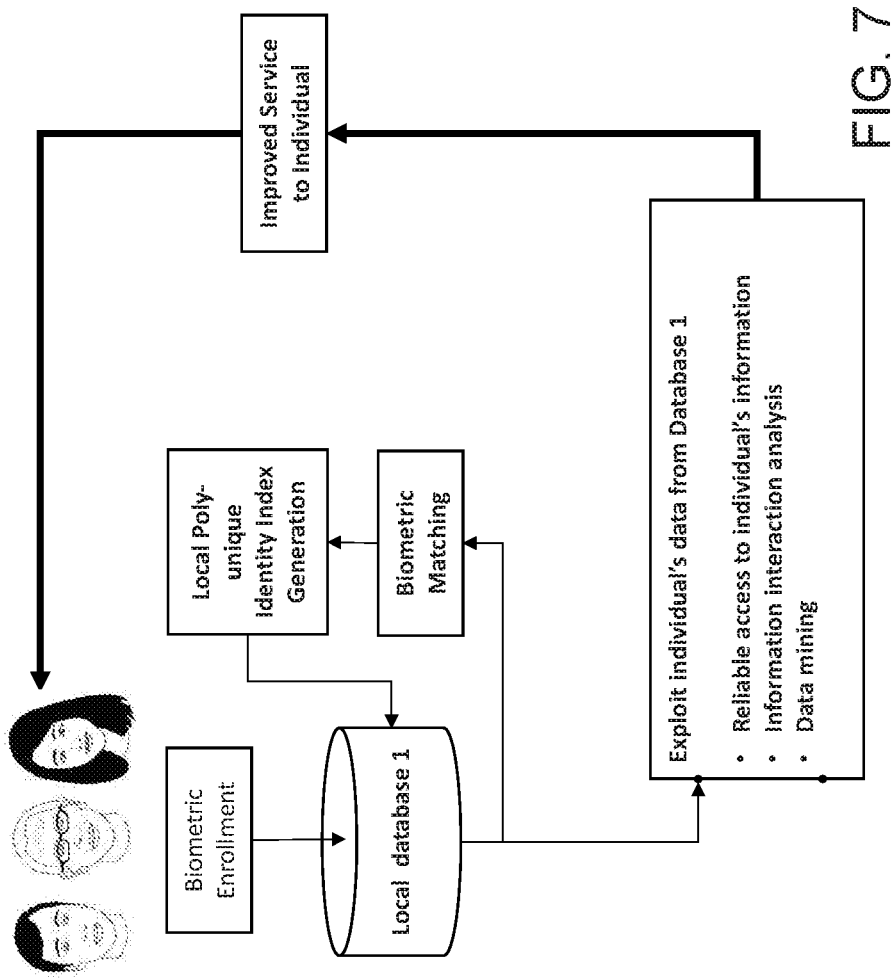
FIG. 7 illustrates one embodiment of an identity management system that makes use of a first database in a first organization, configured to exploit the information in the first database to improve the service provided to the individuals enrolled in the first database.
Figure 8:
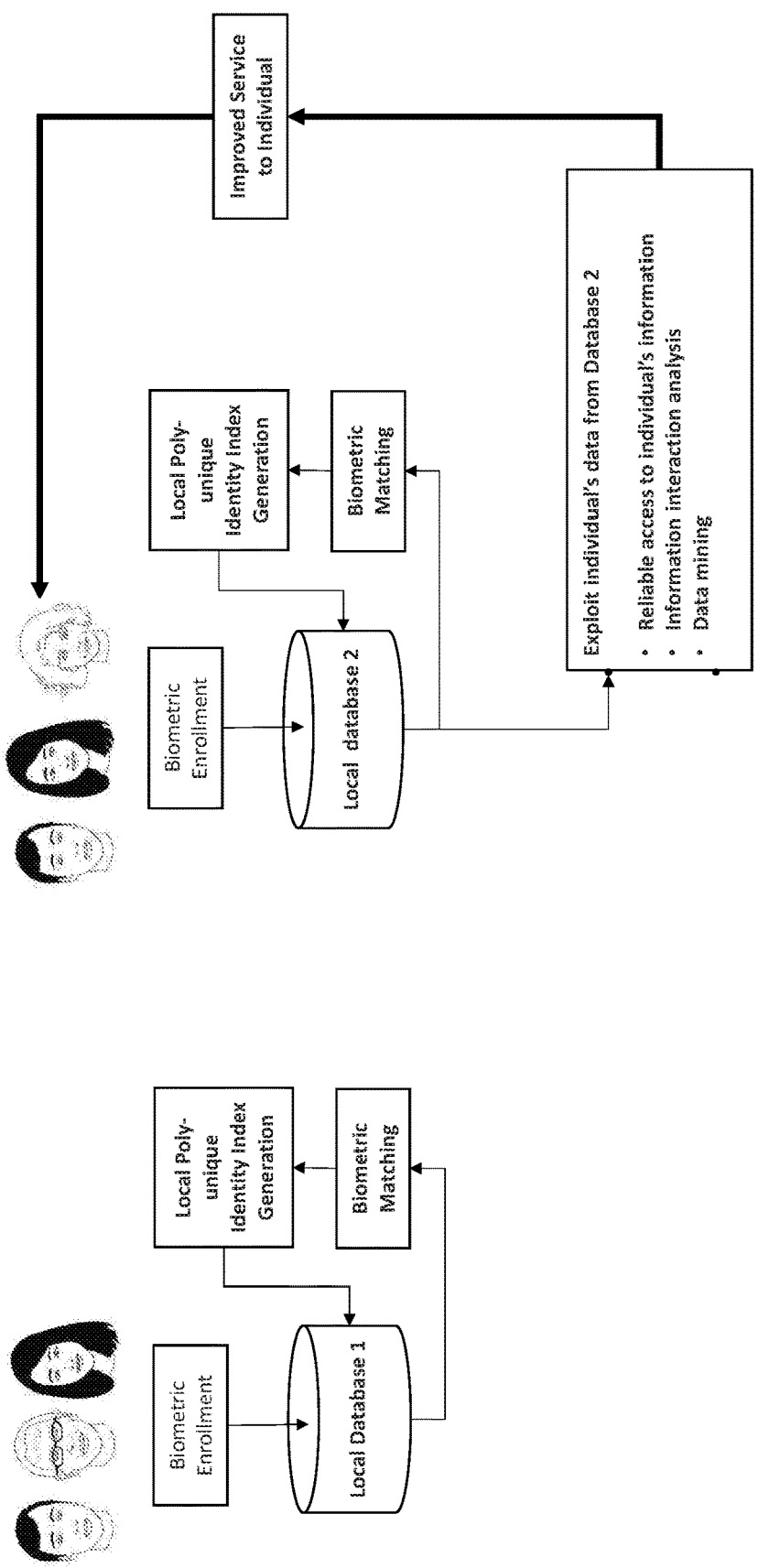
FIG. 8 illustrates a another embodiment of the identity management system that, independently of a first database, makes use of a second database in a second organization, and is configured to exploit the information in the second database to improve the service provided to the individuals enrolled in the second database.
Figure 9:
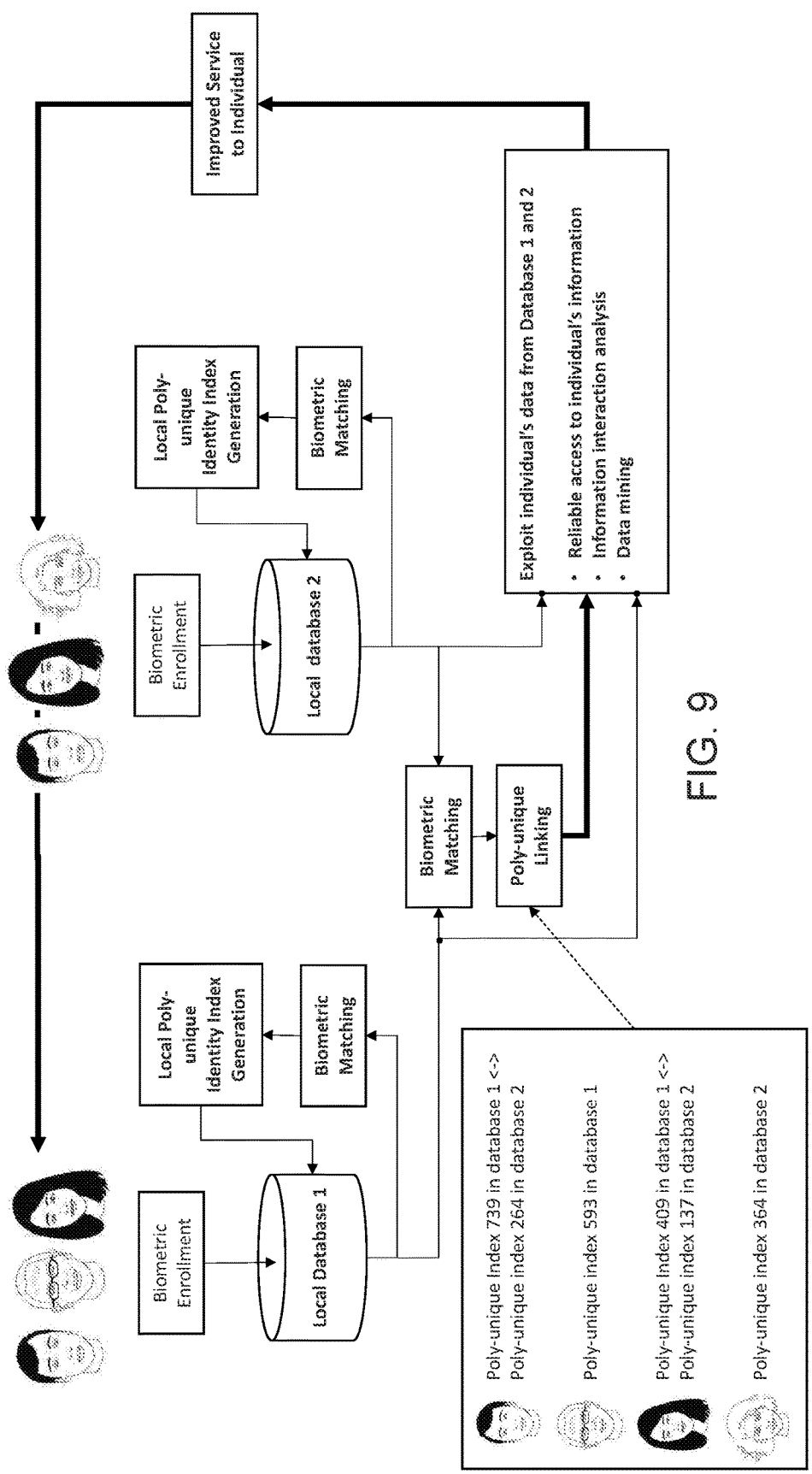
FIG. 9 illustrates an embodiment of an identity management system that makes use of an independently-established first database and an independently-established second database, and that is configured to exploit information in both the first and second databases to improve service provided to individuals enrolled in either or both the first and second databases.

FIG. 7 illustrates one example embodiment of a decentralized biometric identity management system. The decentralized biometric identity management system may make use of a first database in a first organization, and may be configured to exploit the information in a first database corresponding to a first identity management system to improve the service provided to the individuals enrolled in the first database. More specifically, as indicated in FIG. 7, the improved service may in some embodiments include reliable access to the individual's information (as opposed to the retrieval of another individual's information), and data mining that makes use of the individual's information tracked reliably over time or across different organizations. FIG. 8 illustrates another instantiation of the same biometric identity management system established independently for another set of individuals. Similarly, the embodiment in FIG. 8 may also be configured to exploit the information in the database to improve the service provided to the individuals enrolled in the database. Note that two (2) of the individuals are in common between the instantiation of the biometric identity management system in FIG. 7 and the instantiation in FIG. 8. For example, the biometric identity management systems in FIGS. 7 and 8 may have been established independently by two different organizations, and the individual may subscribe to, or be in a healthcare program by, both organizations. FIG. 9 shows how in some embodiments the decentralized biometric identity management system incrementally makes use of the information established independently in the separate system instantiations shown in FIGS. 7 and 8, such that the service provided to the individuals in the system instantiation in FIG. 9 incorporates information individually or in aggregate from both identity management systems. In some embodiments, this may significantly improve the service or level of care provided to the individual.

Privacy

In some embodiments, as information is aggregated from multiple databases then privacy of the information exchanged may become an issue. For example, repeated requests made to an individual's record in a database that pertains to a particular topic (such as a disease) exposes a relationship between the individual and that topic even though the content of the information is unknown. In some embodiments, this problem can be solved using two methods. The first method is the use of obfuscation. In this method, many false exchanges or queries are made to a database in order to obscure the real information exchange between systems. If the number of false exchanges exceeds the number of true exchanges by a factor of 100, for example, then it is difficult for automatic algorithms to determine which exchanges contain real information. The second method is the use of zero-knowledge proofs. In this method, a query can be made from one system to the next and an affirmative or negative response provided, without revealing any information in the query. The method can be implemented using cryptographic methods that are, for example, described in detail in "Zero-Knowledge Proof and Authentication Protocols" by Benjamin Lipton.

Removing Access to Data

Figure 10:
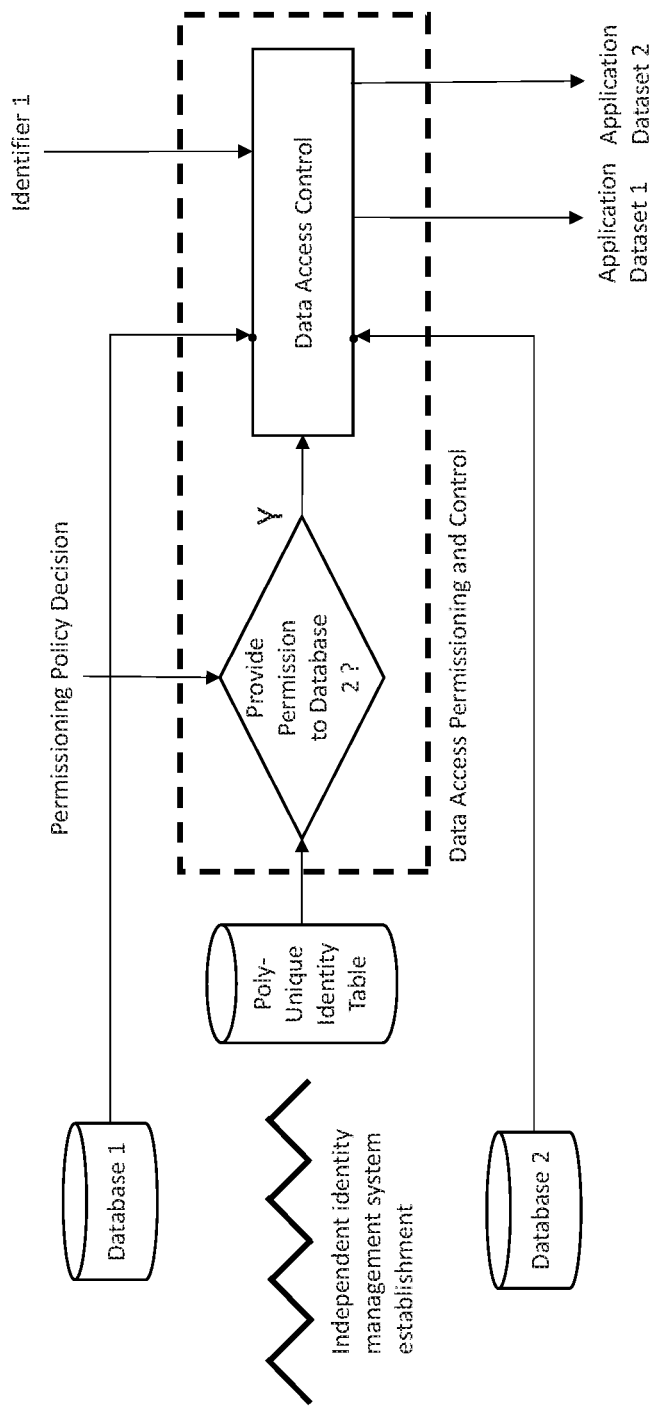
FIG. 10 illustrates an example embodiment of the data access permissioning and control module that was shown in FIG. 1, configured to enable access to Application Dataset 2 using Identifier 1.
Figure 11:
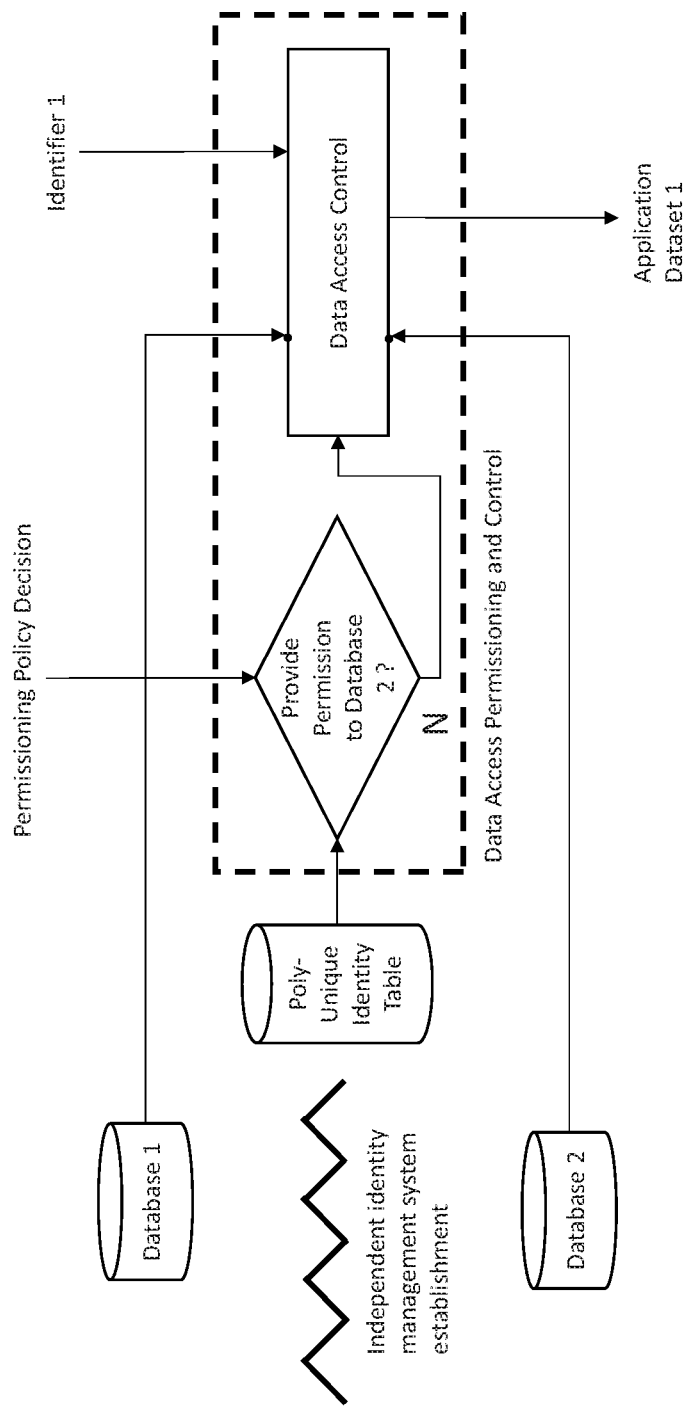
FIG. 11 illustrates an example embodiment of the data access permissioning and control module that was shown in FIG. 1, configured to disable or remove access to Application Dataset 2 using Identifier 1.
Figure 12:
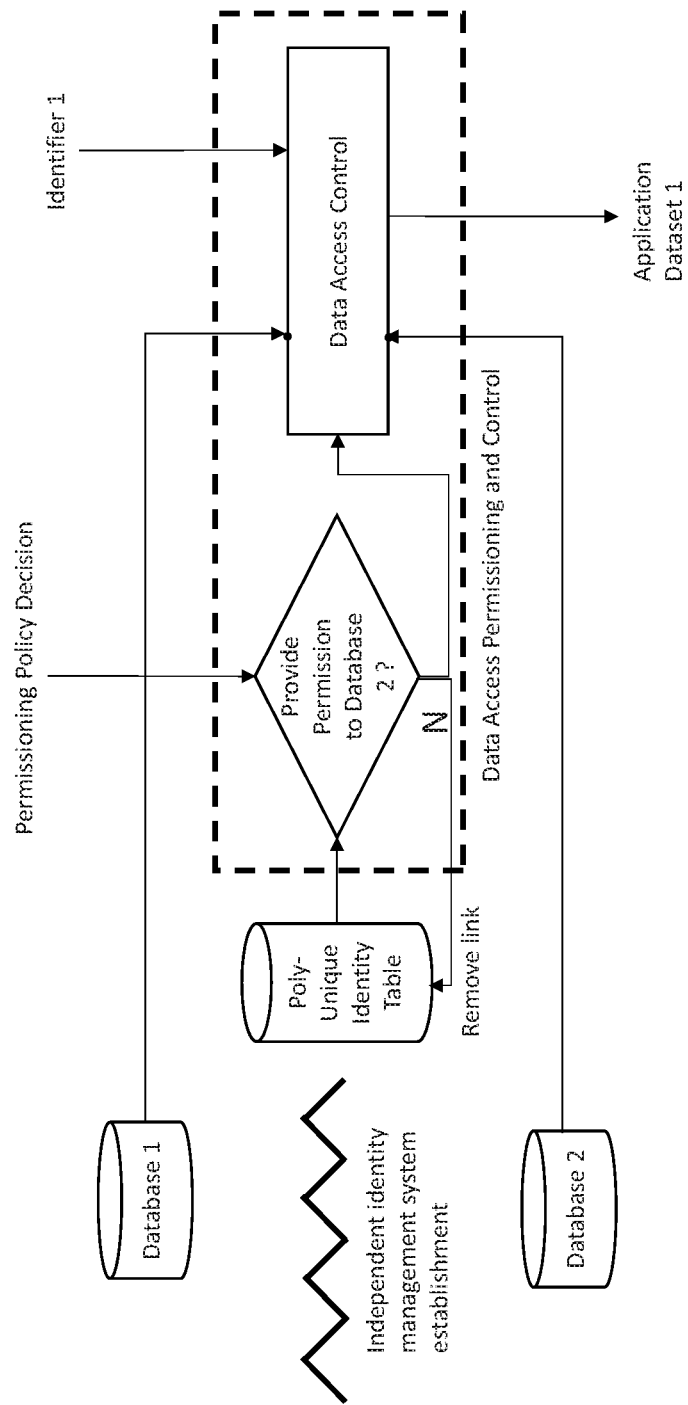
FIG. 12 illustrates an example embodiment of the data access permissioning and control module that was shown in FIG. 1, configured to disable or remove access to Application Dataset 2 using Identifier 1, and also configured to remove the corresponding link in the poly-unique link table.

In some embodiments of biometric identity management systems, the issuance and use of a centralized index number is a potential barrier to adoption since once such an index number has been issued for an individual, it may be difficult to revoke it and unsubscribe from its use. In some cases, organizations may be more comfortable providing access to their data as long as they can easily remove access seamlessly at a later time and continue exploiting the data themselves independently. Methods for performing this, in some embodiments, are shown in FIGS. 10, 11 and 12. FIGS. 10, 11 and 12 show an expanded version of a Data Access Permissioning and Control module, for example the Data Access Permissioning and Control module that was shown in FIGS. 1 and 6. The Data Access Permissioning and Control module includes two components: a Permissioning Decision module and a Data Access Control module. The Permissioning Decision module has one or more Permission Policy Decisions as input. In some embodiments, these decisions may be configured to be one or more signals or data fields. In some embodiments, a particular signal or data-field controlling access to a given identity management system and its corresponding database may be controlled solely by the organization controlling the given identity management system. In some embodiments, the signal or data-field can then be used in one or both of two ways. In one embodiment, the signal or data-field is used to control the Data Access Control module so that other organizations cannot access the data in the given identity management system and its corresponding database leaving access to other databases intact. This disabling of access is for example shown in FIG. 11 where the Permissioning Decision module provides a control signal to the Data Access Control module that prevents access to the data in the given identity management system and its corresponding database. In some embodiments of the system shown in FIG. 11, access to the given identity management system and its corresponding database can be re-enabled if the organization controlling the given database provides the appropriate signal or data-field input into the Permissioning Decision Module. This can be contrasted to the method shown in FIG. 12 whereby a signal from the Permissioning Decision module is used to remove all links for all poly-unique indices from the given identity management system stored in the poly-unique link table. This irreversibly removes any association between the data held by the given organization and all other organizations and their corresponding identity management systems. If the given organization also prevents other organizations from accessing the biometric data sets in its identity management system and its corresponding database, then the poly-unique link table cannot be recreated to include the given identity management system. The given organization however can continue to use the poly-unique indices that it generated independently for its own instantiation of the biometric identity management system, and can at a later time re-subscribe to the larger biometric identity management system that incorporates other biometric identity management systems from other organizations.

Figure 13:
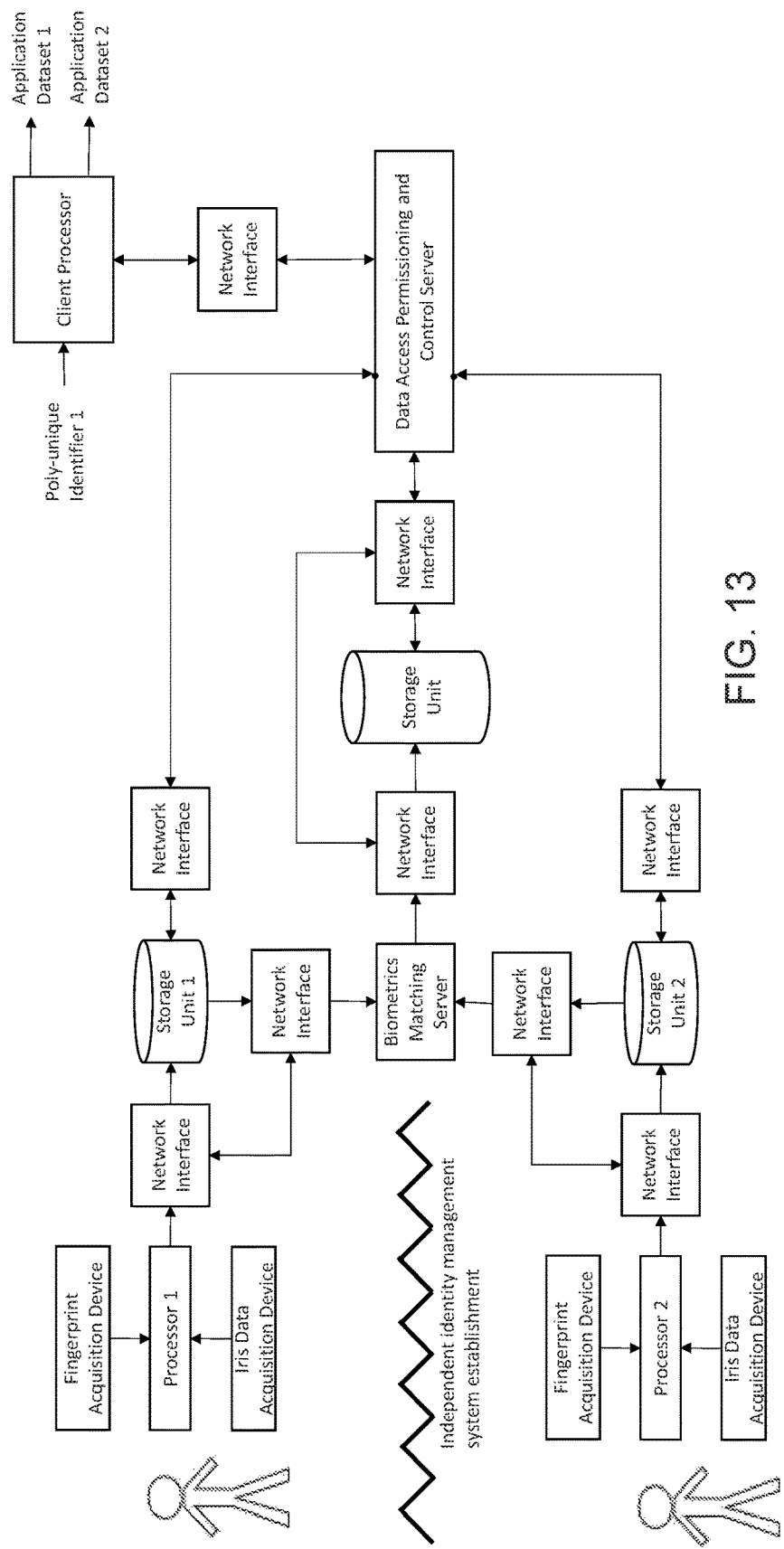
FIG. 13 shows an embodiment of an implementation of the system.

FIG. 13 shows an implementation of the system. At the top left is a first processor, which in some embodiments may comprise a Dell Inspiron 3650 computer with an integrated network interface for instance. A monitor and mouse are connected to the computer. Connected to the processor by network or USB link are two biometric devices; an iris data acquisition device and a fingerprint data acquisition device. In some embodiments, these devices may comprise a CIS 202 iris reader manufactured by 3M, and a Morphotop 100 fingerprint reader device manufactured by Safran, as examples. At the bottom left is an independently-established system that in some embodiments may comprise similar or the same components. Internal to each computer is a storage device, as shown in FIG. 13.

A biometrics matching server, that in some embodiments may also comprise a Dell Inspiron 3650 computer with an integrated network interface for example, is connected to the first and second processor by computer network via the network interfaces. Internal to the computer is a storage unit which is connected by a network interface to the processor, as shown in FIG. 13. Connected to the biometric matching server and its storage module is a Data Access Permissioning and Control server that may also comprise in some embodiments a Dell Inspiron 3650 computer for instance. A client processor that in some embodiments may also comprise a Dell Inspiron 3650 computer for instance, is connected via a network interface to the Data Access Permissioning and Control server, which in turn may also be connected via network interfaces to the independently-generated databases in Storage Unit 1 and 2 respectively.

In this particular embodiment, ancillary data and biometric data for individuals may be acquired using the biometric devices and the computers shown at the top left and bottom left of FIG. 13. In some embodiments, the poly-unique index generation may be performed on this processor. Again in this particular embodiment, the biometric data may be sent via network interface to the biometrics matching server where biometric match algorithms are performed. In some embodiments, these match algorithms may comprise the Fingerprint SDK and Iris Recognition SDK supplied by Neurotechnology for instance. The poly-unique link table may in some embodiments may be generated by the biometric match server and stored on the connected storage unit.

An application connected to a client computer (shown at the top right of FIG. 13) may in some embodiments make a request for Application Dataset information for an individual using poly-unique identifier 1. The request may be sent via network interface to the Data Access Permission and Control server, which accesses the poly-unique link table and accesses any permission flags or signals. In this particular embodiment, the Data Access Permission and Control server then accesses Storage unit 1 and 2 respectively, retrieves Application Dataset 1 and 2, and re-transmits it via network interface to the client computer as shown.

Each of the elements, modules, submodules or entities, referenced herein in connection with any embodiment of the present systems or devices, is implemented in hardware, or a combination of hardware and software. For instance, each of these elements, modules, submodules or entities can include any application, program, library, script, task, service, process or any type and form of executable instructions executing on hardware of the respective system. The hardware includes circuitry such as one or more processors, for example.

It should be understood that the systems described above may provide multiple ones of any or each of those components and these components may be provided on either a standalone machine or, in some embodiments, on multiple machines in a distributed system. The systems and methods described above may be implemented as a method, apparatus or article of manufacture using programming and/or engineering techniques to produce software, firmware, hardware, or any combination thereof. In addition, the systems and methods described above may be provided as one or more computer-readable programs embodied on or in one or more articles of manufacture. The term "article of manufacture" as used herein is intended to encompass code or logic accessible from and embedded in one or more computer-readable devices, firmware, programmable logic, memory devices (e.g., EEPROMs, ROMs, PROMs, RAMs, SRAMs, etc.), hardware (e.g., integrated circuit chip, Field Programmable Gate Array (FPGA), Application Specific Integrated Circuit (ASIC), etc.), electronic devices, a computer readable non-volatile storage unit (e.g., CD-ROM, floppy disk, hard disk drive, etc.). The article of manufacture may be accessible from a file server providing access to the computer-readable programs via a network transmission line, wireless transmission media, signals propagating through space, radio waves, infrared signals, etc. The article of manufacture may be a flash memory card or a magnetic tape. The article of manufacture includes hardware logic as well as software or programmable code embedded in a computer readable medium that is executed by a processor. In general, the computer-readable programs may be implemented in any programming language, such as LISP, PERL, C, C++, C#, PROLOG, or in any byte code language such as JAVA. The software programs may be stored on or in one or more articles of manufacture as object code.

While various embodiments of the methods and systems have been described, these embodiments are exemplary and in no way limit the scope of the described methods or systems. Those having skill in the relevant art can effect changes to form and details of the described methods and systems without departing from the broadest scope of the described methods and systems. Thus, the scope of the methods and systems described herein should not be limited by any of the exemplary embodiments and should be defined in accordance with the accompanying claims and their equivalents.

I claim:

1. A method for an identity management system capable of being deployed incrementally, comprising:

performing, by a biometric processing engine executing on at least one server, biometric matching between a first plurality of records from a first database and a second plurality of records from a second database, the first database and the second database comprising financial-related or criminal-related databases established independently of each other, wherein each record from the first and second pluralities of records comprises a biometric record, and a corresponding identifier implemented to be unique across databases including the first and second databases;

determining, by the biometric processing engine, that a first biometric record of a first record from the first database and a second biometric record of a second record from the second database, are from a same individual, the first record comprising a first unique identifier and the second record comprising a second unique identifier;

maintaining, by a records arbitrator, in a poly-unique identity table on a storage device responsive to the determination, a link between the first unique identifier of the first record from the first database, and the second unique identifier of the second record from the second database; and providing, by the records arbitrator via one or more network interfaces to the first and second databases, in response to receiving a request identifying the first unique identifier or the second unique identifier, access to information about the individual linked to or stored with the first record of the first database, and information about the individual linked to or stored with the second record of the second database, according to the link maintained in the poly-unique identity table.

2. The method of claim 1, wherein determining that the first biometric record and the second biometric record are from the same individual comprises determining that a level of matching between the first biometric record and the second biometric record exceeds a predefined threshold.

3. The method of claim 1, wherein each of the first biometric record and the second biometric record includes two types of biometric data.

4. The method of claim 1, further comprising using the first unique identifier or the second unique identifier identified in the received request, to index into the poly-unique identity table to identify the first record of the first database and the second record of the second database.

5. The method of claim 1, wherein the information about the individual linked to the first record and the information about the individual linked to the second record comprise at least one of medical, criminal or credit-score related information.

6. The method of claim 1, further comprising:
performing biometric matching between a third plurality of records from a third database of the databases, and at least one of the first and second pluralities of records, the third database established independently of the first and second databases;
determining that a third biometric record of a third record from the third database is from the same individual, the third record comprising a third unique identifier; and
updating, by the records arbitrator, in the poly-unique identity table responsive to the determination that the third biometric record is from the same individual, the link to include the third unique identifier of the third record from the third database.

7. The method of claim 1, further comprising:
determining that a third biometric record of a third record from the first database is from an individual different from that corresponding to other biometric records in the first and second databases, the third record comprising a third unique identifier; and
maintaining, by the records arbitrator, in the poly-unique identity table, an entry with the third unique identifier of the third record from the first database.

8. The method of claim 1, further comprising removing, by the records arbitrator, from the poly-unique identity table, the link between the first unique identifier of the first record from the first database and the second unique identifier of the second record from the second database, responsive to an instruction to cease providing access to the information stored in the first database.

9. The method of claim 1, wherein the first database, the second database, and the poly-unique identity table are each maintained by a different organization or entity.

10. The method of claim 1, wherein the first database and the poly-unique identity table are maintained by a first organization or entity, and the second database is maintained by a second organization or entity.

11. A system for decentralized identity management, that is capable of being deployed incrementally, the system comprising:
a biometric processing engine executing on at least one server, the biometric processing engine configured to:
perform biometric matching between a first plurality of records from a first database and a second plurality of records from a second database, the first database and the second database comprising financial-related or criminal-related databases established independently of each other, wherein each record from the first and second pluralities of records comprises a biometric record, and a corresponding identifier implemented to be unique across databases including the first and second databases;
determine that a first biometric record of a first record from the first database and a second biometric record of a second record from the second database, are from a same individual, the first record comprising a first unique identifier and the second record comprising a second unique identifier;
one or more network interfaces to the first and second databases; and
a records arbitrator configured to:
maintain, responsive to the determination, in a poly-unique identity table on a storage device, a link between the first unique identifier of the first record from the first database, and the second unique identifier of the second record from the second database; and
provide, via the one or more network interfaces, in response to receiving a request identifying the first unique identifier or the second unique identifier, access to information about the individual linked to or stored with the first record of the first database, and information about the individual linked to or stored with the second record of the second database, according to the link maintained in the poly-unique identity table.

12. The system of claim 11, wherein the biometric processing engine is further configured to determine that the first biometric record and the second biometric record are from the same individual, by determining that a level of matching between the first biometric record and the second biometric record exceeds a predefined threshold.

13. The system of claim 11, wherein each of the first biometric record and the second biometric record includes two types of biometric data.

14. The system of claim 11, wherein the records arbitrator is further configured to use the first unique identifier or the second unique identifier identified in the received request, to index into the poly-unique identity table to identify the first record of the first database and the second record of the second database.

15. The system of claim 11, wherein the information about the individual linked to the first record and the information about the individual linked to the second record comprise at least one of medical, criminal or credit-score related information.

16. The system of claim 11, wherein
the biometric processing engine is further configured to:
perform biometric matching between a third plurality of records from a third database of the databases, and at least one of the first and second pluralities of records, the third database established independently of the first and second databases; and
determine that a third biometric record of a third record from the third database is from the same individual, the third record comprising a third unique identifier; and
the records arbitrator is further configured to update, in the poly-unique identity table responsive to the determination that the third biometric record is from the same individual, the link to include the third unique identifier of the third record from the third database.

17. The system of claim 11, wherein
the biometric processing engine is further configured to determine that a third biometric record of a third record from the first database is from an individual different from that corresponding to other biometric records in the first and second databases, the third record comprising a third unique identifier; and
the records arbitrator is further configured to maintain, in the poly-unique identity table, an entry with the third unique identifier of the third record from the first database.

18. The system of claim 11, wherein the records arbitrator is further configured to remove, from the poly-unique identity table, the link between the first unique identifier of the first record from the first database and the second unique identifier of the second record from the second database, responsive to an instruction to cease providing access to the information stored in the first database.

19. The system of claim 11, wherein the first database, the second database, and the poly-unique identity table are each maintained by a different organization or entity.

20. The system of claim 11, wherein the first database and the poly-unique identity table are maintained by a first organization or entity, and the second database is maintained by a second organization or entity.

* * * * *